(12) United States Patent
Mahaffy

(10) Patent No.: US 7,637,551 B2
(45) Date of Patent: Dec. 29, 2009

(54) VEHICLE SEAT SUPPORTED PLATFORM FOR TRANSPORTING CARGO IN LEVEL AND NON-DISPLACEABLE FASHION

(75) Inventor: Jennifer Mahaffy, Tipton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 355 days.

(21) Appl. No.: 11/531,573

(22) Filed: Sep. 13, 2006

(65) Prior Publication Data

US 2008/0061575 A1    Mar. 13, 2008

(51) Int. Cl.
B60R 7/04    (2006.01)

(52) U.S. Cl. .................. 296/24.34; 296/63; 296/39.1; 224/275

(58) Field of Classification Search ............... 296/24.34, 296/37.1, 37.5, 37.8, 37.15, 63, 39.1, 24.31; 224/539, 275; 160/223, 224, 370.23, DIG. 2; 297/227, 188.16, 188.17, 145; 312/311, 312/313

See application file for complete search history.

(56) References Cited

U.S. PATENT DOCUMENTS

| | | | |
|---|---|---|---|
| 1,803,947 A | | 5/1931 | Runkles et al. |
| 1,869,444 A | | 8/1932 | Tobey |
| 1,959,974 A | * | 5/1934 | Westgate .................... 5/94 |
| 2,502,963 A | * | 4/1950 | Klee ..................... 224/275 |
| 2,524,909 A | * | 10/1950 | Hines .................. 312/235.6 |
| 3,583,760 A | | 6/1971 | McGregor |
| 3,632,161 A | | 1/1972 | Arfaras et al. |
| 4,777,994 A | * | 10/1988 | Nederveld ............... 160/84.04 |
| 4,834,449 A | | 5/1989 | Engelman |
| 4,958,576 A | | 9/1990 | Kauer et al. |
| 5,102,080 A | * | 4/1992 | Altieri, Jr. .................. 248/174 |
| 5,470,002 A | * | 11/1995 | DiStefano et al. ........... 224/275 |
| 5,588,697 A | | 12/1996 | Yoshida et al. |
| 6,032,587 A | * | 3/2000 | Salenbauch et al. ........... 108/44 |
| 6,170,725 B1 | * | 1/2001 | Ganues ...................... 224/539 |
| 6,347,590 B1 | | 2/2002 | D'Annunzio et al. |
| 6,487,979 B2 | | 12/2002 | Ash et al. |
| 6,746,069 B1 | | 6/2004 | McKenzie |
| 6,793,281 B2 | * | 9/2004 | Duerr et al. ................. 297/147 |
| 2004/0134946 A1 | * | 7/2004 | Gammon .................... 224/275 |
| 2006/0091169 A1 | * | 5/2006 | Lippert et al. ............... 224/275 |
| 2006/0220425 A1 | * | 10/2006 | Becker et al. .......... 297/188.16 |
| 2007/0108787 A1 | * | 5/2007 | Dohan ...................... 296/37.15 |
| 2007/0241581 A1 | * | 10/2007 | Martin ...................... 296/37.8 |

FOREIGN PATENT DOCUMENTS

FR    2832109    5/2003

* cited by examiner

Primary Examiner—Jason S Morrow
(74) Attorney, Agent, or Firm—Gifford, Krass, Sprinkle, Anderson & Citkowski, P.C.

(57) ABSTRACT

A platform for use in establishing a load supporting surface upon a vehicle seat bottom. The platform includes at least one and typically a plurality of planar shaped panels, connected in either hinged or telescoping fashion, and which are displaceable from a stored to an extensible position covering a vehicle seat bottom, such that the upper surface of the platform is maintained in level fashion between front and rear locations of the seat bottom. The assembleable platform may be provided as a separate aftermarket item or may be incorporated into a vehicle interior console such that it is displaceable outwardly and across the vehicle seat.

18 Claims, 4 Drawing Sheets

VEHICLE SEAT SUPPORTED PLATFORM FOR TRANSPORTING CARGO IN LEVEL AND NON-DISPLACEABLE FASHION

BACKGROUND OF THE INVENTION

1. Field of the Invention

The present invention relates generally to a platform support apparatus for use in a vehicle. More specifically, the present invention teaches a foldable, multi-piece platform for establishing a level and rigid surface upon an inclined seat bottom. The platform assembly may be incorporated into the vehicle interior architecture, such as actuating from a center or side console associated with a front or rear passenger seat, or be provided as an aftermarket accessory.

2. Description of the Prior Art

The prior art is documented with various types of tray or platform supports, such as for use in land vehicles, boats, planes and the like. The purpose of such supports is often to provide a level and rigid surface, such as for use by an individual seated within the given type of vehicle.

U.S. Pat. No. 6,347,590, issued to D'Annunzio et al., teaches a tray table for a vehicle that is extensible from and may be stored in a center console. The center console has longitudinally shiftable lateral side walls that define a pocket for storing the tray table. The lateral walls of the center console are moveable along a track to permit fore and aft adjustment of the location of the table relative to a seat in the vehicle. A push button is provided on a pivot locking mechanism to lock and unlock a tray support arm. A cup holder may be provided on the tray support arm that is moveable between a storage position in which it is parallel to the tray support arm and a use position in which it is it is perpendicular to the tray support arm.

U.S. Pat. No. 6,746,069, issued to McKenzie, teaches a cover system for use with a vehicle having a seat including a mounting member that is attachable to the vehicle. The cover system further includes a cover movably associated with the mounting member such that the flexible and sheet-like cover is unrollable from a stored position to a deployed position in which the cover extends at least partially over the seat.

SUMMARY OF THE PRESENT INVENTION

The present invention teaches a platform for use in establishing a load supporting surface upon a vehicle seat bottom. The platform includes at least one and typically a plurality of planar shaped panels, connected in either hinged or telescoping fashion, and which are displaceable from a stored to an extensible position covering a vehicle seat bottom, such that the upper surface of the platform is maintained in level fashion between front and rear locations of the seat bottom.

The assembleable platform may be provided as a separate aftermarket item or may be incorporated into a vehicle interior console such that it is displaceable outwardly and across the vehicle seat. The panels may each further, by way of example and without limitation, exhibit a cross-sectional wedge shape interconnected along mutual edges of increasing depth, and in order to provide enhanced leveling support upon the seat and accounting for the rearward/downward incline of the seat bottom.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
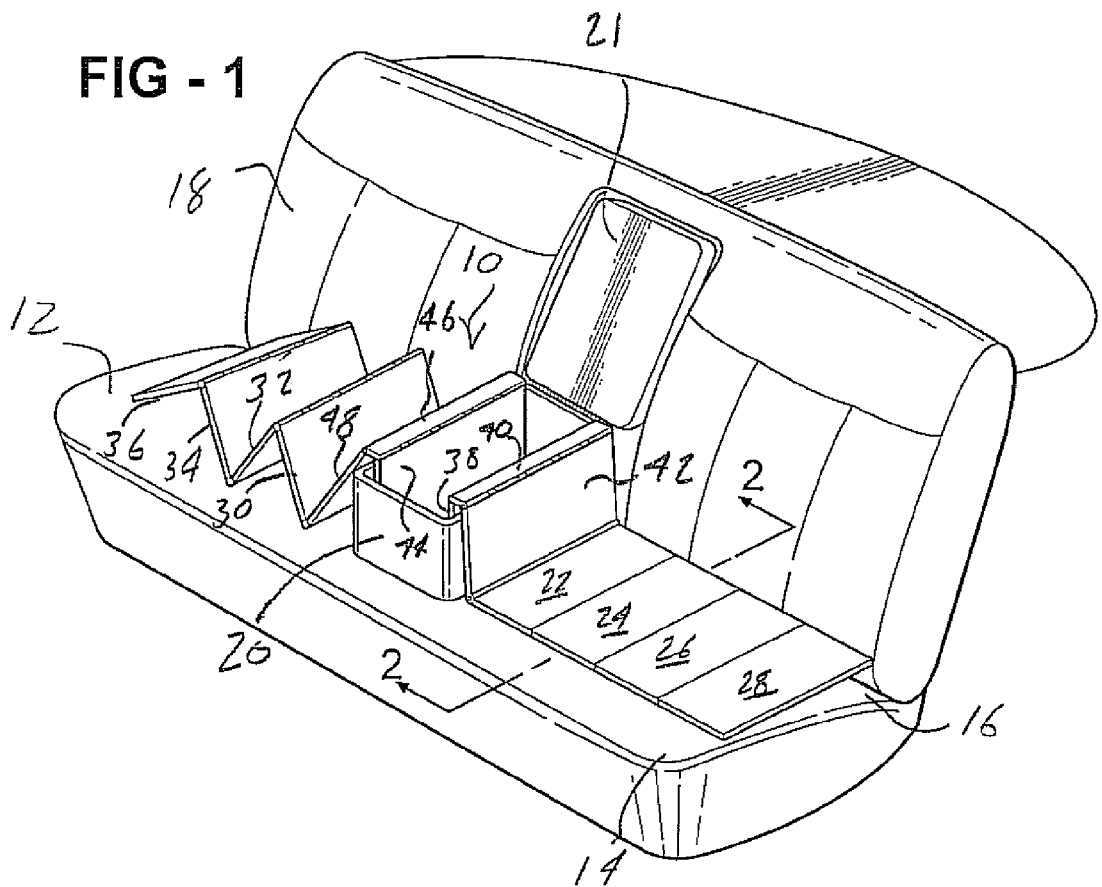
FIG. 1 is a perspective view of a seat supported platform according to an accordion embodiment actuated from within a rear seat center console.

Referring now to FIG. 1, an illustration is shown at 10 of a platform for use in establishing a load supporting surface upon a vehicle seat bottom 12 and according to a first selected embodiment of the present inventions. As will be progressively described throughout the succeeding several views, any platform assembly according to the inventions provides the ability to establish a durable, substantially rigid and level surface upon the seat bottom 12, and which takes into account the uneven taper or angle of the seat bottom from its front 14 to rear 16 edges.

A seat back 18 is also provided in conventional arrangement relative to the seat bottom 12, further defining the vehicle interior. A console 20 may be interposed at a middle location of a vehicle rear seat arrangement, as illustrated, or be located along either a side of a front or rear positioned seat. The console 20 further illustrates a hingedly connected lid 21 in the selected examples shown however, and to the extent employed in the present inventions, is understood to encompass any design, arrangement, or configuration suitable for holding and outwardly actuating/displacing the platform assembly or assemblies from a front or rear seat location.

As will also be discussed throughout the description of the succeeding illustrated embodiments, as well as additional non-illustrated embodiments, the platform may also be provided as a separate aftermarket item, not attached to the vehicle, and capable of being assembled upon a front or rear seat bottom in order to provide a cargo supporting and non-slip/non-spill level surface. Such a surface may further exhibit, without limitation, a tactile/rubberized/skid-resistant coating, such as applied upon a rigid underlayer. The covering/coating may further include a fabric overlayer or other material to provide enhance gripping of the articles set thereupon (not shown) as well as preventing movement of the same such as when the vehicle is in motion.

Referring back to FIG. 1, the illustrated perspective view of the seat supported platform 10 illustrates first and second individual pluralities of rectangularly shaped and hingedly interconnected panels, separately actuating from within the rear center seat console 20. In particular, a first plurality of panels are illustrated at 22, 24, 26 and 28, whereas a second plurality of panels are shown at 30, 32, 34 and 36 according to an accordion embodiment actuated from within the console 20.

The panels are each constructed typically constructed of a rigid plasticized material, such as is illustrated, and may additionally include, without limitation, either wood, manufactured wood, metal (e.g. typically lightweight aluminum). As regards to the further illustrated embodiment of FIGS. 7-8, the wedge shaped articles illustrated may further include such as a hardened exterior surface, under which is defined a foamable/expanded substrate material (see in particular FIG. 8) which can provide the necessary leveling support as well as structural integrity.

Figure 2:
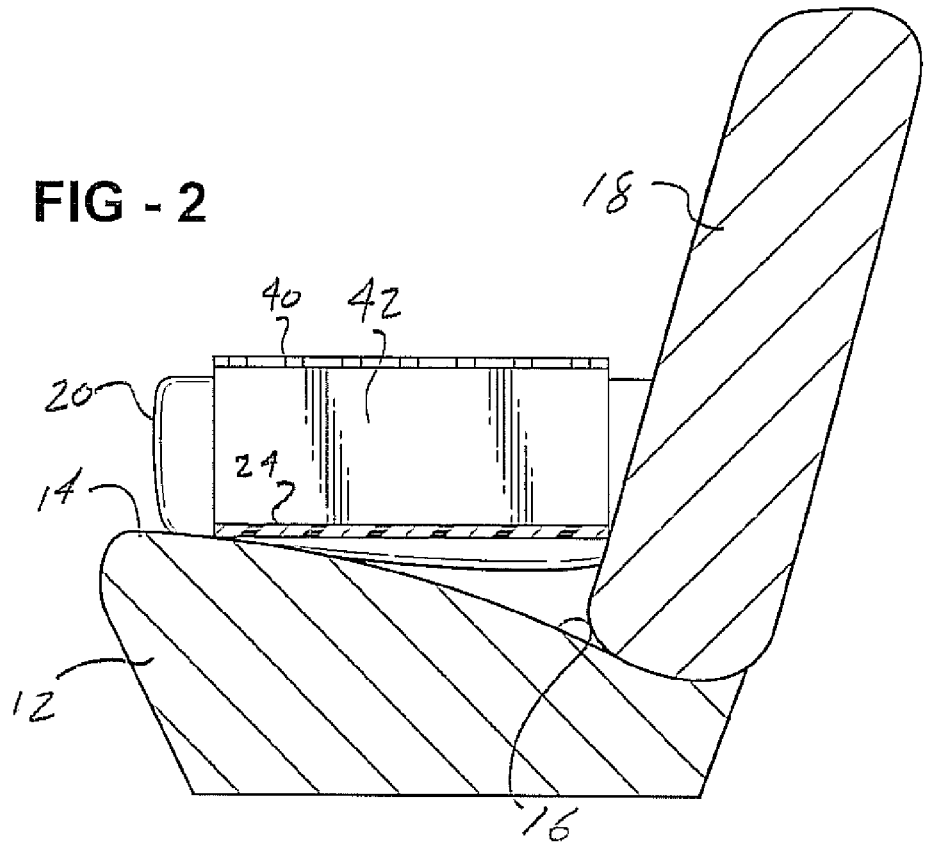
FIG. 2 is a side cutaway view taken along line 2-2 of FIG. 1 and showing the manner in which the platform establishes a level cargo supporting surface upon a vehicle seat.
Figure 3:
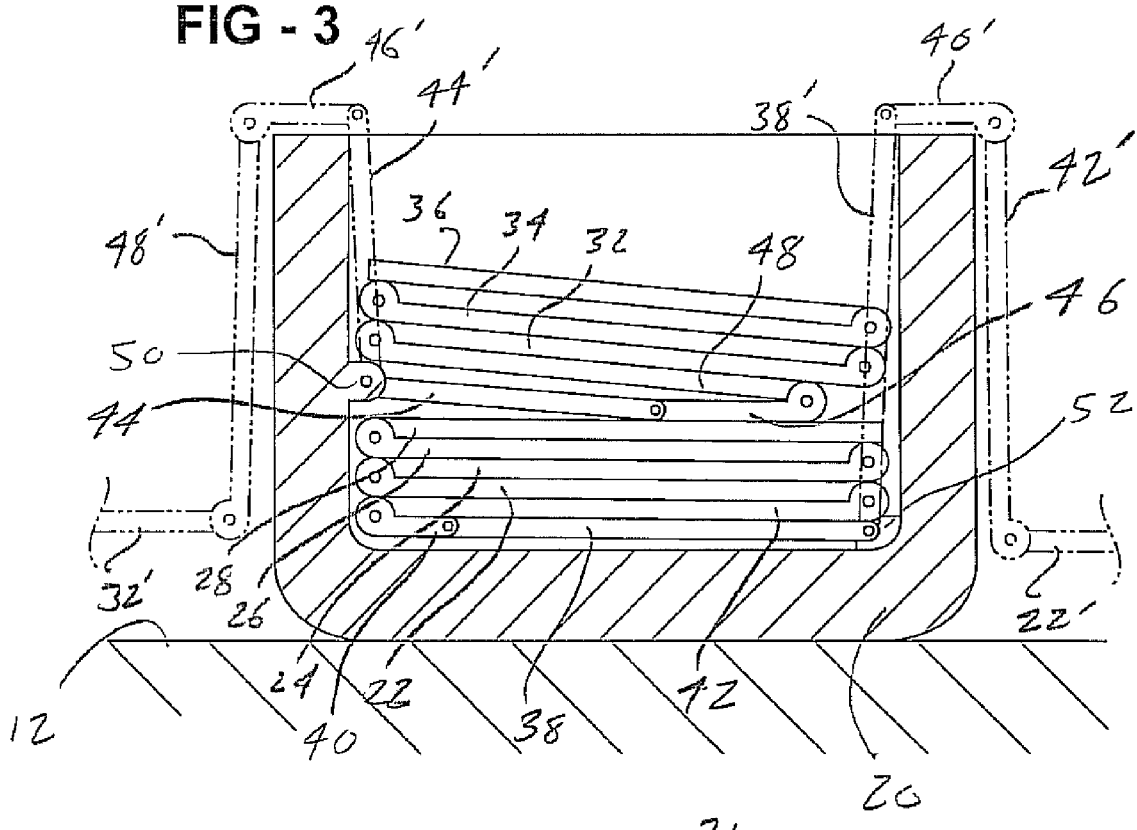
FIG. 3 is a cutaway end view of the embodiment in FIG. 1 and illustrating the foldable/accordion nature of the platform when stored within the console.

The number of hingedly interconnected panels may vary, without limitation, with each hinged connection established between succeeding panels and, as illustrated in FIG. 3, being constructed to prevent over rotation of the panels beyond the coplanar and level position. Additional hingedly connected panels are associated with the interior console 20 and assist in displacing the pluralities of panels outwardly to the positions generally referenced in FIG. 1. These include hingedly connected panels 38, 40, and 42 (preceding and interconnecting to the successive accordion hinged panels 22, 24, 26 and 28) as well as hinged panels 44, 46 and 48 (likewise preceding and interconnecting to the successive accordion hinged panels 30, 32, 34 and 36). The construction of the hinged edge connections established between each interconnected panel in FIGS. 1-3 is such that they establish a fixedly supported connection when rotated to the coplanar position, it being further understood that the hinged edges can extend in partial and spaced apart fashion or may extend the entire edge distance of each panel connection.

As further shown in the cutaway end view of FIG. 3, illustrating the foldable/accordion nature of the platform both when stored as well as actuated from within the console, the hinged relationship of these initial components is illustrated in better detail. In particular, an initial connection is shown at 50 to which portion 38 is hingedly secured, resulting in the selected plurality of panels being displaced outwardly (see in phantom at 38', 40', 42', 22', etc.). Likewise, and still referencing FIG. 3, an opposite and offset internal edge connection within the console 20 is established at 52, resulting in the further selected plurality of panels being displaced outwardly (see again in phantom at 44', 46', 48', 32', etc.).

Figure 5:
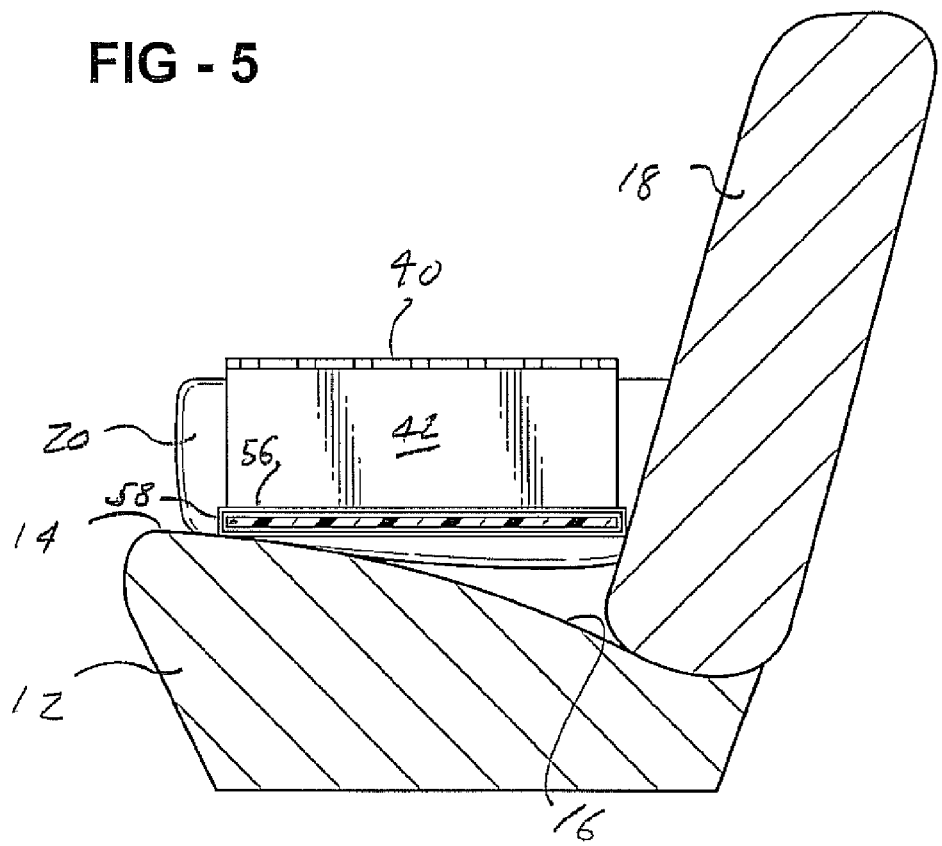
FIG. 5 is a side cutaway view taken along line 5-5 of FIG. 4 and illustrating again both the telescoping as well as the level and cargo supporting nature of the platform upon the vehicle seat.
Figure 6:
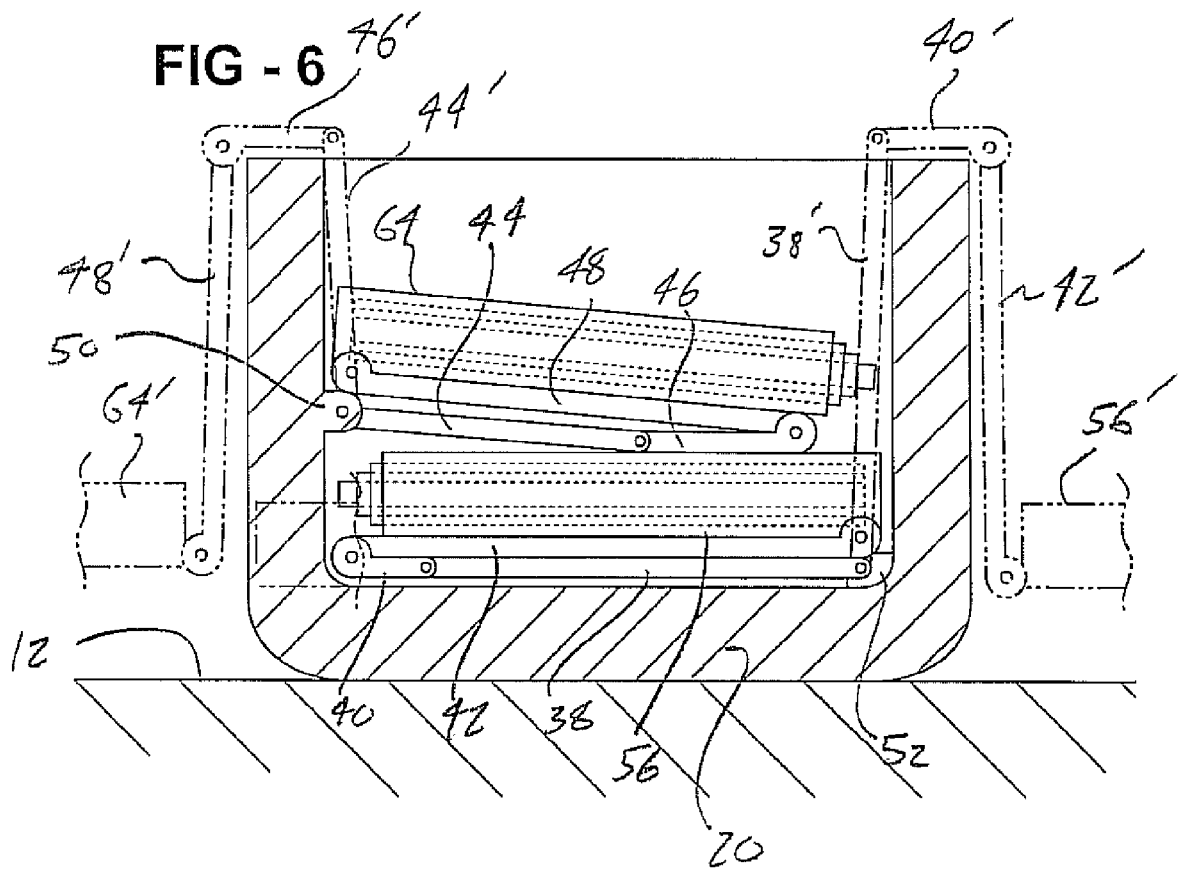
FIG. 6 is a cutaway end view of the embodiment of FIG. 4 and illustrating the convertible nature of the platform when stored within the console.

By virtue of the interior support established within the console for the individual pluralities of panels, the substantially parallel assembled panels (i.e., again 22-28 and 30-36) in the selected variant may maintain a substantially level and load bearing condition when displaced over the vehicle seat, due in part to the support derived from the hinged connection to the console 20, and without varying the cross-sectional thickness or dimensions of each interconnected panel. As will be discussed in future variants, the cross-sectional dimensions of the interconnected panels may change (such as by example in the telescoping arrangement of FIGS. 4-6 or the wedge block design of FIGS. 7-8) without limitations and within the scope of the inventions.

Figure 4:
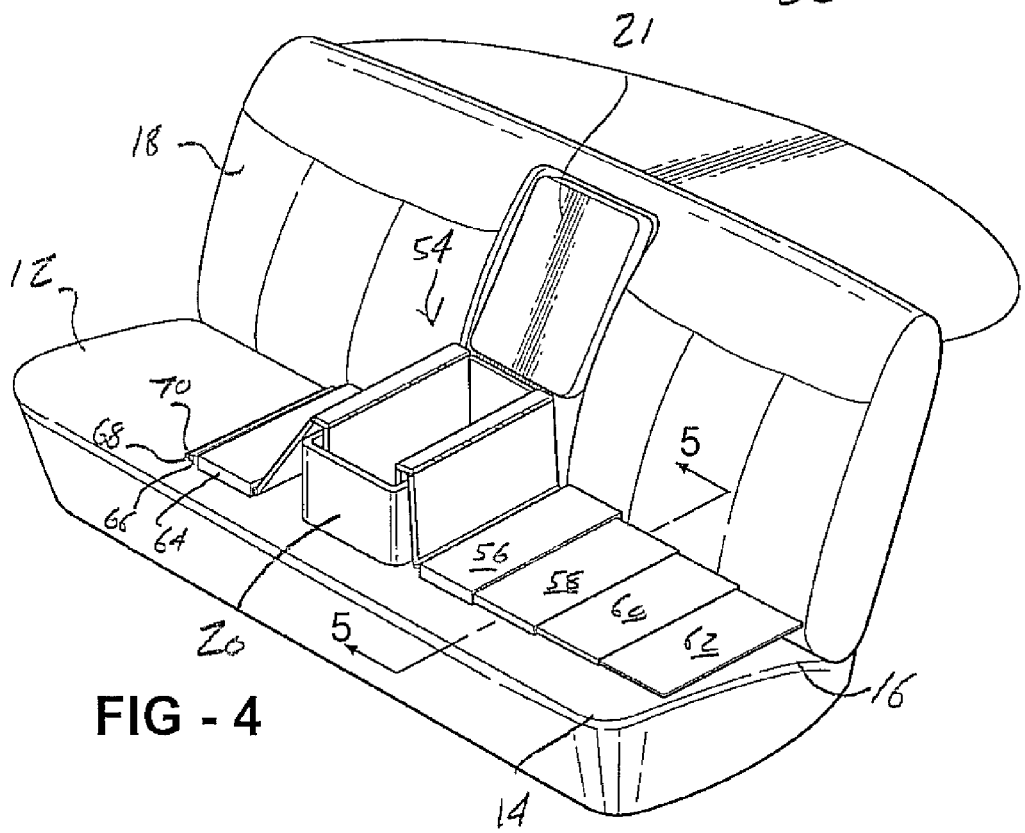
FIG. 4 is a perspective view of another seat supported platform according to a telescoping embodiment.

Referring now to FIG. 4, a perspective view is shown at 54 of another seat supported platform according to a telescoping embodiment. The arrangement of FIG. 4 illustrates first and second pluralities of telescoping panels, see as shown at 56, 58, 60, and 62, as well as at 64, 66, 68 and 70, respectively. The individual and telescoping panels each further exhibit interior end stop geometry (not shown) and which prevent the inner telescoping panels from being disengaged from their respective outer panels. The arrangement and construction of each of the panels is also such that they provide a rigid and durable material (i.e. again such as being plastic) and which further establishes a substantially level and supporting surface for cargo items placed upon the seat bottom 12 and for which a durable support surface is desired.

Similar to the illustration in the embodiment of FIG. 3, the individual pluralities of interconnected panels include additional linkage structure which both supports and displaces the same from within the console 20. These are identically referenced in relation to that shown in FIG. 3 and include hingedly connected panels 38, 40, and 42 (preceding and interconnecting to the successive telescoping panels 56-62) as well as hinged panels 44, 46 and 48 (likewise preceding and interconnecting to the successive telescoping panels 64-70).

As further shown in the cutaway end view of FIG. 6, illustrating again the stored/telescoping nature of the platform assembly within the console, the hinged relationship of these initial components is again illustrated in better detail. In particular, the initial connection is again shown at 50 to which portion 38 is hingedly secured, resulting in the selected plurality of panels being displaced outwardly (see in phantom at 38', 40', 42', 56', etc.). Likewise, an opposite and offset internal edge connection within the console 20 is established at 52, resulting in the further selected plurality of panels being displaced outwardly (see again in phantom at 44', 46', 48', 64', etc.). Extensible and rigid support is further provided by the telescoping interconnections between the respective panels and, similar to the description afforded the embodiment of FIGS. 1-3, assists in maintaining the level arrangement of the platform when supporting weighted/cargo items (not shown) upon the vehicle seat bottom 12, and in particular its uneven surface.

Figure 7:
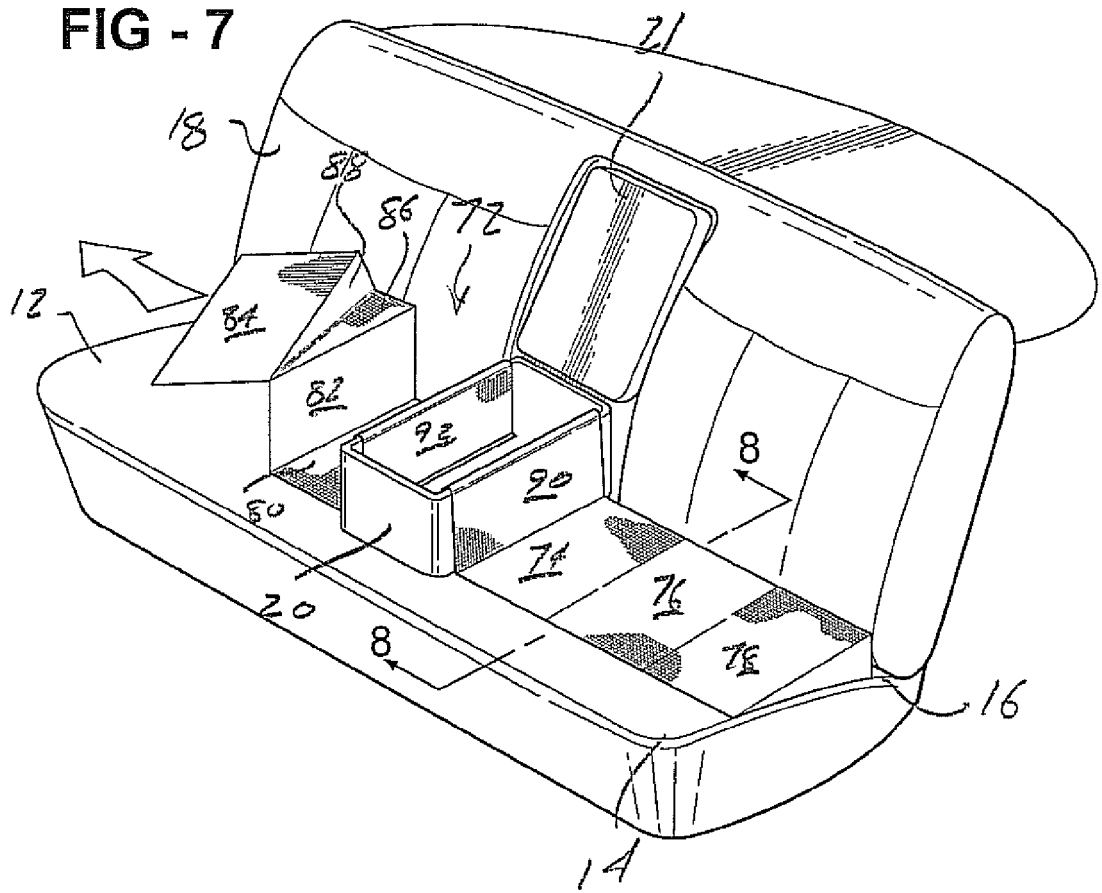
FIG. 7 is a perspective view of a seat supported platform according to a yet additional embodiment and by which a plurality of cross-sectional wedge shaped sections are interconnected to provide improved leveling cargo support and upon being displaced across an arcuate seat bottom.
Figure 8:
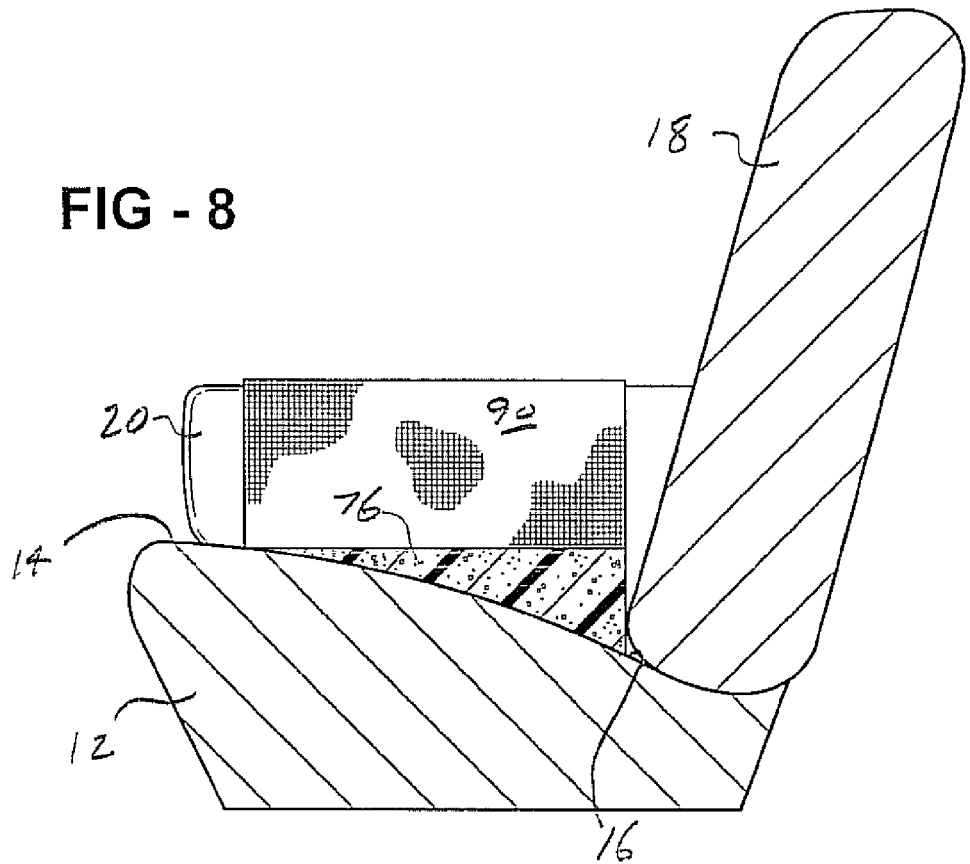
FIG. 8 is a cutaway view taken along line 8-8 of FIG. 7 and illustrating the supporting nature of the wedge shaped platform sections.

Referring now to FIG. 7, a perspective view is generally shown at 72 of a seat supported platform according to a yet additional embodiment. The panel according to the further illustrated embodiment includes one or more cross-sectional and wedge shaped portions. In particular, and consistent with the illustrations shown in FIGS. 1 and 4, respectively, each of a plurality of wedge shaped portions may be provided, see at 74, 76, and 78 as well as at 80, 82 and 84, respectively, each as shown being hingedly interconnected along an edge of increasing depth from a forward end to a rearward end.

As shown in FIG. 7, a wedge faced interface at each hinged connection, see for example as shown by wedge faced ends 86 and 88 between selected interconnected portions 82 and 84, prevents successive rotation of the panels beyond the parallel rotated position acquired by further selected plurality of wedge portions 74, 76 and 78. As further shown in FIG. 8, initial and thin cross-sectional skirts, see at 90 and 92, are adapted to attach to opposite interior locations of the console 20, such that the wedge shaped panels (i.e. at 74 and 82, respectively) connecting to a remote edges of the skirts 90 and 92 displace outwardly from the console 20.

In this variant, the cross-sectional wedge shaped sections are interconnected to provide improved leveling cargo support and upon being displaced across the arcuate seat bottom as defined between forward edge 14 and rearward edge 16. As previously described, the material construction of the wedge shaped sections is further such that they provide substantially independent leveling and cargo supporting ability (given its wedge and irregular cross-sectional shape to matingly correspond to the likewise irregular surface of the seat bottom).

Accordingly, the wedge shaped sections illustrate one potential variant of an independently installable and aftermarket platform for use with an existing vehicle, and which is not otherwise secured to the vehicle or an associated front/rear console housing. As also previously described, and referencing the cutaway view of FIG. 8, the supporting nature of the selected wedge shaped platform section 76 is shown, as is its foamable/expanded and rigid structural composition which lends itself to providing the desired degree of independent support.

Having described my invention, other and additional preferred embodiments will become apparent to those skilled in the art to which it pertains, and without deviating from the scope of the appended claims.

I claim:

1. A load supporting platform displaceable from within a console associated with a seat, comprising:
   a first panel pivotally supported by the console along a first edge and extending downwardly from the console such that a second opposite edge is in contact with at least a portion of the seat; and
   a second panel pivotally connected to said first panel along said second edge, said second panel extending along a generally horizontal plane proximate the seat.

2. A load supporting platform displaceable from within a console associated with a seat, comprising:
   a skirt secured to an interior location of the console along a first edge and extending outwardly and downwardly from the console such that a second edge is in contact with at least a portion of the seat; and
   a panel connected to said skirt along said second edge and extending along a generally horizontal plane proximate the seat, said panel exhibiting a wedge shape thickness of increasing depth from a forward end to a rearward end.

3. The platform as described in claim 1, said second panel further comprising a plurality of rectangular shaped panels hingedly connected in end-to-end fashion.

4. The platform as described in claim 3, further comprising pairs of first and second panels extending from opposite sides of the console, said plurality of rectangular shaped panels further comprising first and second individual pluralities of panels.

5. The platform as described in claim 3, further comprising at least one additional panel hingedly connected at a first end to an inside surface of the console and at a second end to said first edge of said first panel, said first and second panels actuating outwardly from within the console and providing leveling support to said plurality of rectangular shaped panels extending across the vehicle seat.

6. The platform as described in claim 3, further comprising a hinged connection established between each of said rectangular shaped panels, each of said hinged connections preventing rotation of successive panels beyond a parallel rotated position.

7. The platform as described in claim 1, said second panel further comprising a plurality of rectangular shaped panels connected in a telescoping fashion.

8. The platform as described in claim 7, further comprising pairs of first and second panels extending from opposite sides of the console, said plurality of rectangular shaped panels further comprising first and second individual pluralities of panels.

9. The platform as described in claim 7, further comprising at least one additional panel hingedly connected at a first end to an inside surface of the console and at a second end to said first edge of said first panel, said first and second panels actuating outwardly from within the console and providing leveling support to said plurality of rectangular shaped panels extending across the vehicle seat.

10. The platform as described in claim 1, said second panel further comprising a wedge shape thickness of increasing depth from a forward end to a rearward end.

11. The platform as described in claim 10, said second panel further comprising a plurality of wedge shaped panels, each of which being hingedly interconnected along an edge of increasing depth from its forward end to its rearward end.

12. The platform as described in claim 11, further comprising pairs of first and second panels extending from opposite sides of the console, said plurality of wedge shaped panels further comprising first and second individual pluralities of wedge shaped panels.

13. The platform as described in claim 12, further comprising a wedge faced interface at each hinged connection between each of said wedge shaped panels preventing successive rotation of said panels beyond a parallel rotated position.

14. The platform as described in claim 12, each of said pair of first panels further comprising an initial and thin cross-sectional skirt adapted to attaching to an interior location of the console, an initial one of said wedge shaped panels associated with each of said first and second pluralities of panels connecting to said skirt and displacing outwardly from the console.

15. The platform as described in claim 1, said panel further comprising a specified shape and size and being constructed of a material including at least one of a plastic, wood or lightweight metal.

16. The platform as described in claim 11, each of said wedge shaped panels further comprising a material including at least a foamable plasticized interior and a durable surface including a hardened plastic, metal or wood.

17. The platform as described in claim 2, further comprising a pair of skirts secured to and extending from opposite sides of the console, said plurality of wedge shaped panels further comprising first and second individual pluralities of wedge shaped panels, an initial one of said wedge shaped panels associated with each of said first and second pluralities of panels connecting to said skirt and displacing outwardly from the console.

18. The platform as described in claim 17, further comprising a wedge faced interface at each hinged connection between each of said wedge shaped panels preventing successive rotation of said panels beyond a parallel rotated position.

* * * * *

UNITED STATES PATENT AND TRADEMARK OFFICE
CERTIFICATE OF CORRECTION

PATENT NO.       : 7,637,551 B2                                      Page 1 of 1
APPLICATION NO. : 11/531573
DATED            : December 29, 2009
INVENTOR(S)      : Jennifer Mahaffy It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 462 days.

Signed and Sealed this

Ninth Day of November, 2010

David J. Kappos
*Director of the United States Patent and Trademark Office*